(12) United States Patent
Weng et al.

(10) Patent No.: US 8,467,119 B2
(45) Date of Patent: Jun. 18, 2013

(54) ELECTROCHROMIC DISPLAY DEVICE

(75) Inventors: Wu Weng, Tsukuba (JP); Toshimi Fukuoka, Tsukuba (JP); Tetsuya Higuchi, Tsukuba (JP); Masao Suzuki, Tsukuba (JP); Masatoshi Ono, Tsukuba (JP)

(73) Assignees: Funai Electric Advanced Applied Technology Research Institute Inc., Daito-shi (JP); Funai Electric Co., Ltd., Daito-shi (JP)

( * ) Notice: Subject to any disclaimer, the term of this patent is extended or adjusted under 35 U.S.C. 154(b) by 152 days.

(21) Appl. No.: 13/191,130

(22) Filed: Jul. 26, 2011

(65) Prior Publication Data
US 2012/0026572 A1  Feb. 2, 2012

(30) Foreign Application Priority Data

Jul. 27, 2010 (JP) ................. 2010-167833

(51) Int. Cl.
*G02F 1/153* (2006.01)
*H01J 17/49* (2012.01)

(52) U.S. Cl.
USPC ........... 359/273; 359/265; 359/268; 359/271; 345/5; 313/584; 29/850

(58) Field of Classification Search
USPC .................. 359/265–275; 345/5, 60–63, 107; 29/830–831, 850; 313/581–586
See application file for complete search history.

(56) References Cited

U.S. PATENT DOCUMENTS

| | | | |
|---|---|---|---|
| 5,189,549 A * | 2/1993 | Leventis et al. | 359/271 |
| 5,444,330 A * | 8/1995 | Leventis et al. | 313/506 |
| 7,995,262 B2 * | 8/2011 | Higuchi et al. | 359/273 |
| 8,106,853 B2 * | 1/2012 | Moore et al. | 345/5 |
| 8,166,649 B2 * | 5/2012 | Moore | 29/850 |
| 2011/0141544 A1 | 6/2011 | Suzuki et al. | |

FOREIGN PATENT DOCUMENTS

| | | |
|---|---|---|
| JP | 2005-84216 A | 3/2005 |
| JP | 2006-267657 A | 10/2006 |
| JP | 2008-32911 A | 2/2008 |
| WO | WO 2010/013532 A1 | 2/2010 |

OTHER PUBLICATIONS

The Extended European Search Report dated Nov. 16, 2011 (Five (5) pages).

* cited by examiner

*Primary Examiner* — Loha Ben
(74) *Attorney, Agent, or Firm* — Crowell & Moring LLP

(57) ABSTRACT

An electrochromic display device including: a first substrate; first electrodes parallely extending on the first substrate; a second substrate opposite to the first substrate; second electrodes parallely extending in a direction orthogonal to the first electrodes on the second substrate; and an electrochromic composition layer between the substrates, wherein the device is passive-matrix driven to perform a display by energization between the electrodes, and to perform erasing of the display by energization in a reverse direction, a pixel is formed in a portion where the first electrodes sterically intersect with the second electrodes, and metal electrical wires extending over the regions between the second electrodes and the second substrate along the second electrodes, each of metal electrical wires being conductively connected to each of the second electrodes corresponding to any one of the regions, and insulated from each of the second electrodes corresponding to the other regions.

5 Claims, 8 Drawing Sheets

ELECTROCHROMIC DISPLAY DEVICE

BACKGROUND OF THE INVENTION

1. Field of the Invention

The present invention relates to an electrochromic display device.

2. Description of Related Art

Along with popularization of an electronic information network, publication in the form of an electronic book, namely electronic publication, has come to be actively performed, in place of publication in the form of a book using a conventional printing technique. As a device which displays electronic information distributed by such a network, for example, a CRT (Cathode Ray Tube) display and a backlight type liquid crystal display have generally been used. However, with respect to a display using these display devices, a place where a user can read the display is more restricted and a weight, size, shape and portability are inferior in terms of handling, compared with a conventional display printed on paper. Further, since these display devices consume large electrical power, when driving them with a battery, a display time is restricted. Moreover, since these display devices are light emission type displays, they may cause too much tiredness when a user fixes the eyes on the devices for a ling time.

Accordingly, a display device which can solve the problem as described above has been desired. Further, a rewritable display device has been desired. As such display device, one referred to as a paper-like display or electronic paper has been proposed. Specifically, there have hitherto been proposed, for example, a display device of a reflection type liquid crystal system, a display device of an electrophoretic system, a display device of a system in which a dichroic grain is rotated in an electric field, a display device of an electrochromic system (e.g. see Japanese Patent Application Laid-Open Publication No. 2005-84216), and the like.

However, since the electrochromic display device of Japanese Patent Application Laid-Open Publication No. 2005-84216 supplies a scanning signal to a gate wire to sequentially scan pixels so as to rewrite the pixels on a line-by-line basis, in the case of a display device with a large number of lines, such as a large screen and a high definition screen, rewriting its screen takes a long time.

Therefore, the conventional display device is not suitable for an application requiring a faster rewriting speed and a rapid switching of a screen.

SUMMARY OF THE INVENTION

An object of the present invention is to provide an electrochromic display device which is capable of more rapidly switching a screen.

According to a first aspect of the invention, there is provided an electrochromic display device, including: a first substrate; at least one first electrode which is provided on a top surface of the first substrate; a second substrate which is provided above the first substrate so as to be opposite to the first substrate, and which second substrate is formed of a transparent material; at least one second electrode which is provided on an under surface of the second substrate, and at least part of which second electrode is formed of a transparent material; and an electrochromic composition layer which is provided between the first substrate and the second substrate, wherein the electrochromic display device is a passive-matrix driven electrochromic display device which performs a display by energization between the first electrode and the second electrode, and performs erasing of the display by energization between the first electrode and the second electrode in a reverse direction to the energization for the display, the at least one first electrode is a plurality of electrodes which extend in parallel with one another, the at least one second electrode is a plurality of transparent display electrodes which extend in parallel with one another in a direction orthogonal to the first electrodes, and each of the second electrode is divided into a plurality of regions each of which intersects with the first electrodes, a pixel is formed in a portion where the first electrodes sterically intersect with the second electrodes, and a plurality of metal electrical wires which extend over the regions are provided between the second electrodes and the second substrate in a direction along the second electrodes, each of which metal electrical wires is conductively connected to each of the second electrodes corresponding to any one of the regions, and insulated from each of the second electrodes corresponding to the other regions.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Hereinafter, embodiments of the present invention will be described in detail with reference to the drawings. IN this regard, however, the scope of the invention is not restricted to the illustrated examples.

(Embodiment 1)

<Configuration of Electrochromic Display Device>

Figure 1:
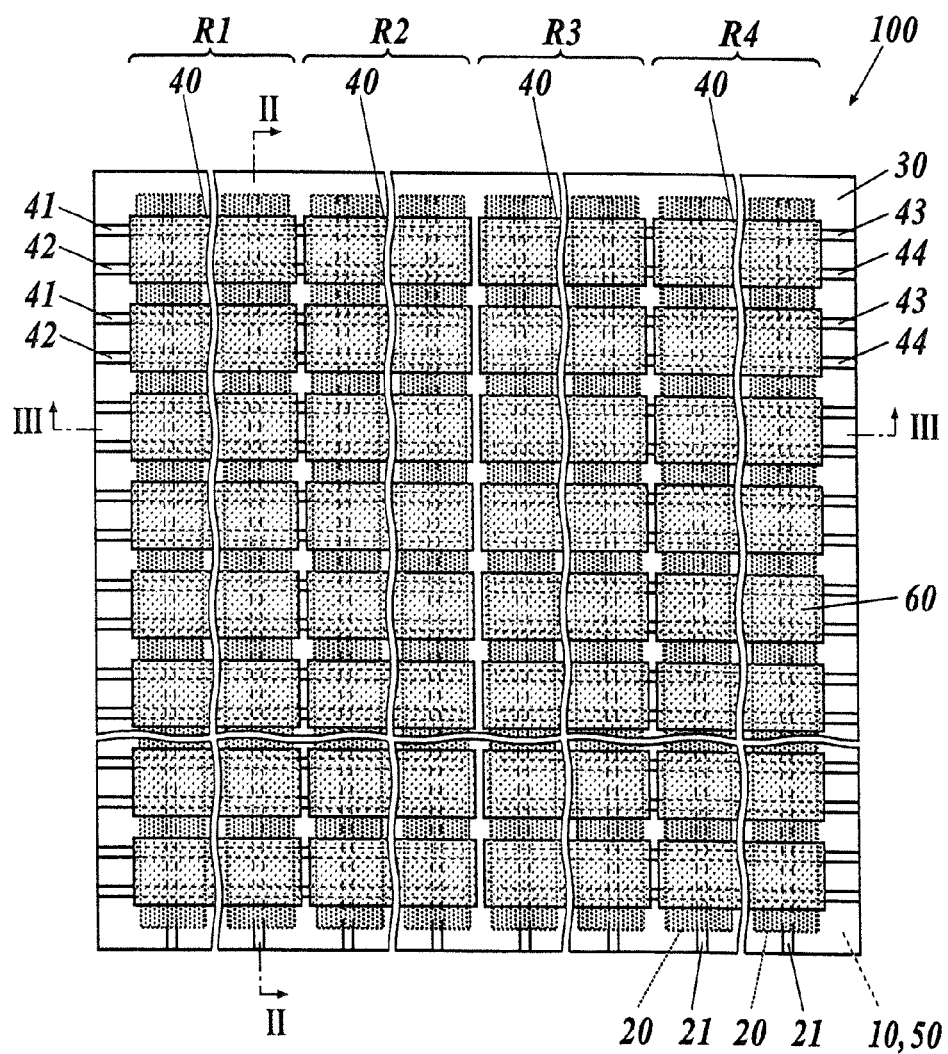
FIG. 1 is a plan view schematically showing an electrochromic display device according to Embodiment 1.
Figure 2:
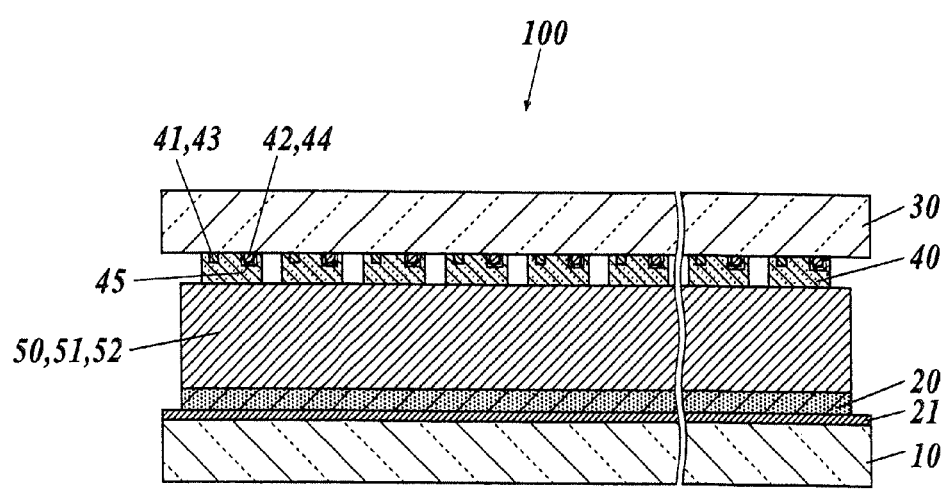
FIG. 2 is a sectional view on a line II-II of FIG. 1.
Figure 3:
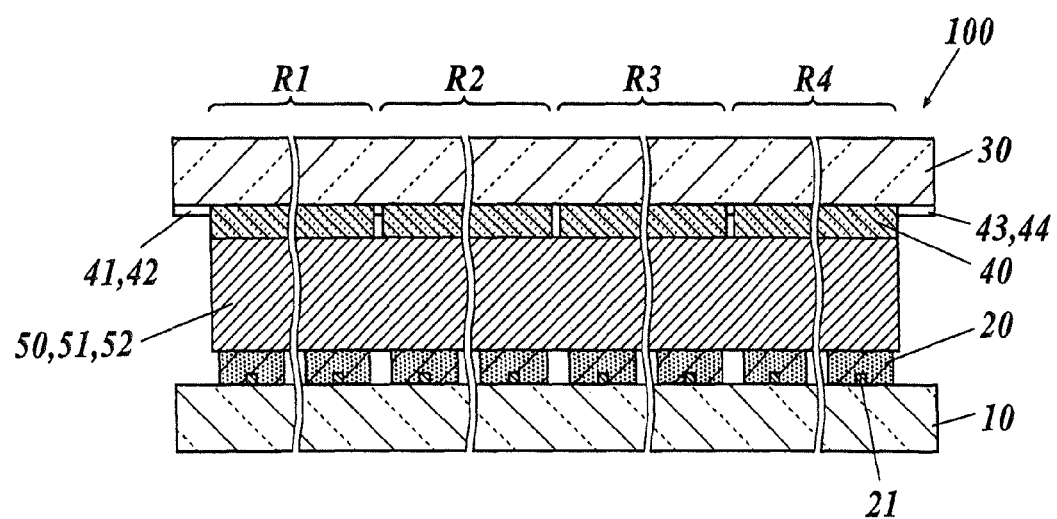
FIG. 3 is a sectional view on a line III-III of FIG. 1.

An electrochromic display device 100 of the present invention is, for example as shown in FIGS. 1 to 3, configured to include: a first substrate 10; first electrodes 20 . . . which are provided on a top surface of the first substrate 10; a second substrate 30 which is provided above the first substrate 10 so as to be opposite to the first substrate 10; second electrodes 40 . . . which are provided on an under surface of the second substrate; and an electrochromic composition layer 50 which is provided between the first substrate 10 and the second substrate 30.

The electrochromic display device 100 is a passive matrix driven display device, which performs a display by energization between the first electrodes 20 . . . and the second electrodes 40 . . . , and performs erasing of the display by energization between the first electrodes 20 . . . and the second electrodes 40 . . . in a reverse direction to a direction of the energization for the display, or by interruption of the energization for the display.

The first electrodes 20 . . . are a plurality of electrodes extending in parallel with one another. The second electrodes 40 . . . is a transparent display electrode which includes a plurality of transparent electrodes extending in parallel with one another in a direction orthogonal to the first electrodes 20 . . . . Pixels 60 . . . are formed in portions where the first electrodes 20 . . . sterically intersect with the second electrodes 40 . . . .

The first substrate 10 is, for example, a transparent substrate formed in a plane shape, and has a function as a substrate of the electrochromic display device 100.

A material for the first substrate 10 is not particularly restricted so long as being an electrically insulating transparent substrate, and for example, glass or plastic can be employed. Examples of the glass may include soda-lime-based glass, low-alkali borosilicate glass, alkali-free borosilicate glass, alkali-free aminosilicate glass, quartz glass, and the like. Further, examples of the plastic may include polyesters such as polyethylene terephthalate and polyethylene naphthalate, polyamides, polycarbonates, fluorine polymers such as polyvinylidene fluoride, polyethers, polyolefins such as polystyrene and polyethylene, polyimides, and the like.

The first electrodes 20 . . . are, for example, transparent electrodes each formed in a linear shape with a width, and are provided in a striped shape in parallel with one another at equivalent intervals. In FIG. 1, the first electrodes 20 . . . extend in a row direction (vertical direction) and juxtapose with one another. Although eight rows of the first electrodes 20 are shown in the figure with the other rows omitted, the first electrodes 20 . . . practically form 768 lines, for example.

The first electrodes 20 . . . are provided on the top surface of the first substrate 10 so as to be in contact with the electrochromic composition layer 50. The first electrodes 20 . . . face the second electrodes 40 . . . and sandwich the electrochromic composition layer 50.

The first electrode 20 . . . have a function to energize the electrochromic composition layer 50 by being paired with the second electrode 40 . . . .

The first electrodes 20 . . . sterically intersect with the second electrodes 40 . . . , namely intersect with a space therewith, and the pixels 60 are formed in the intersection portions.

The material for the first electrode 20 is not particularly restricted so long as being a material capable of constituting a transparent electrode. Examples of the material capable of constituting a transparent electrode may include an ITO film and a thin film coated with $SnO_2$ or $InO_2$. Further, the material may be one obtained by doping Sn, Sb or the like into the ITO film or a thin film coated with $SnO_2$ or $InO_2$, or may be MgO, ZnO, FTO or the like.

Moreover, metal electrode sections 21 are provided between the first electrodes 20 and the first substrate 10 correspondingly to the respective first electrodes 20, each of the metal electrode sections 21 extending along each of the first electrode 20. The metal electrode sections 21 are provided on the top surface of the first substrate 10, and covered by the respective first electrodes 20.

Since the metal electrode sections 21 are buried in the first electrodes 20, resistances of the first electrodes 20 can be reduced. This can result in prevention of a voltage depression in a longitudinal direction of the first electrodes 20 at the time of energization. As a result, color-producing is stabilized in each of the pixels 60 and a uniform display can be obtained.

A material for the metal electrode section 21 is not particularly restricted, but a material constituting a metal electrode can be used. Examples of the material constituting a metal electrode may include gold, platinum, silver, chrome, aluminum, cobalt, palladium, copper, nickel, an alloy of those, and the like.

The second substrate 30 is, for example, a transparent substrate formed in a plain shape, and has a function as a support for the second electrodes 40 . . . .

A material for the second substrate 30 is not particularly restricted so long as being an electrically insulating transparent substrate, and for example, glass or plastic can be employed. Examples of the glass may include soda-lime-based glass, low-alkali borosilicate glass, alkali-free borosilicate glass, alkali-free aminosilicate glass, quartz glass, and the like. Further, examples of the plastic may include polyesters such as polyethylene terephthalate and polyethylene naphthalate, polyamides, polycarbonates, fluorine polymers such as polyvinylidene fluoride, polyethers, polyolefins such as polystyrene and polyethylene, polyimides, and the like.

The second electrodes 40 . . . are, for example, transparent electrodes each formed in a linear shape with a width, and are provided in a striped shape in parallel with one another at equivalent intervals. In FIG. 1, the second electrodes 40 . . . are extended in a line direction (horizontal direction) and juxtapose with one another. Although eight lines of the second electrode 40 are shown in the figure with the other lines omitted, the second electrodes 40 . . . practically form 1024 lines, for example.

Further, each of the second electrodes 40 is divided into a plurality of regions each intersecting with the same number of first electrodes 20. Specifically, each of the second electrodes 40 is divided into four region (R1 to R4) intersecting with 192 lines of the first electrodes 20.

The second electrodes 40 . . . are provided on the under surface of the second substrate 30 so as to be in contact with the electrochromic composition layer 50. The second electrodes 40 . . . face the first electrodes 20 . . . and sandwich the electrochromic composition layer 50.

The second electrodes 40 . . . have a function to energize the electrochromic composition layer 50 by being paired with the first electrodes 20 . . . .

The second electrodes 40 . . . sterically intersect with the first electrodes 20 . . . , namely intersect with a space therewith, and the pixels 60 are formed in the intersection portions.

The second electrode 40 is not particularly restricted so long as being a material capable of constituting a transparent electrode. Examples of the material capable of constituting a transparent electrode may include an ITO film, a thin film coated with $SnO_2$ or $InO_2$, and the like. Further, the material may be one obtained by doping Sn, Sb or the like into the ITO film, the thin film coated with $SnO_2$ or $InO2$, or the like, or may be MgO, ZnO, FTO or the like.

Moreover, metal electrical wires (41 to 44) as metal electrode sections are provided between the second electrodes 40 and the second substrate 30 correspondingly to the respective second electrodes 40, each of the metal electrical wires extending along each of the second electrodes 40. The metal electrical wires (41 to 44) are provided on the under surface of the second substrate 30, and covered by the second electrode 40.

Figure 4:
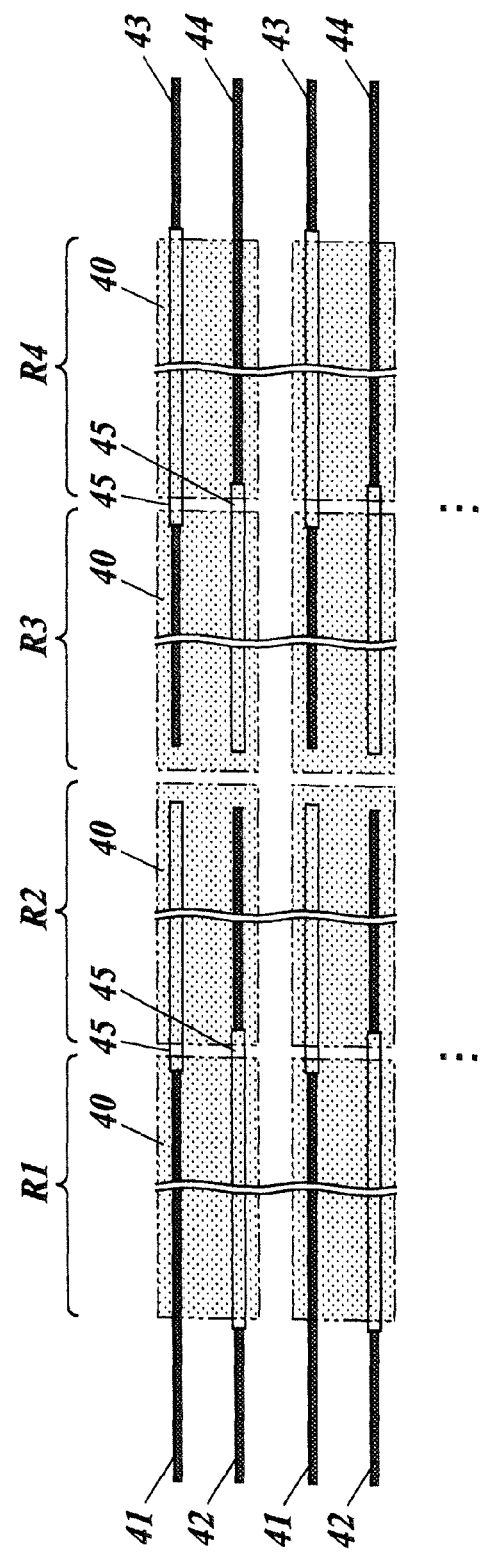
FIG. 4 is an illustrative view showing four regions of a second electrode and an arrangement of metal electrical wires according to Embodiment 1.

Specifically, as shown in FIG. 4, first metal electrical wires 41 and second metal electrical wires 42 extend from one end of the second electrodes 40 to the center side of the substrate, and arranged over a place from a first region R1 to a second region R2 of the second electrodes 40. Each of the first metal electrical wires 41 and each of the second metal electrical wires 42 are provided in parallel separately from each other in the vicinity of both sides of each of the second electrode 40.

Further, as shown in FIG. 4, third metal electrical wires 43 and fourth metal electrical wires 44 extend from the other end of the second electrode 40 to the center side of the substrate, and arranged over a place from a fourth region R4 to a third region R3 of the second electrodes 40. Each of the third metal electrical wire 43 and each of the fourth metal electrical wire 44 are provided in parallel separately from each other in the vicinity of both sides of each of the second electrode 40.

In addition, it is preferable that each of the first metal electrical wires 41 and second metal electrical wires 42, and each of the third metal electrical wires 43 and fourth metal electrical wires 44 be respectively provided on edge sides of each of the second electrodes 40. Since the metal electrical wires (41 to 44) have no optical transparency, providing the metal electrical wires on the edge sides of each of the second electrodes 40 prevents the wires from interfering with a display by color-producing of the pixels 60 (electrochromic composition layer 50).

More specifically, as shown in FIG. 4, a range of each of the first metal electrical wires 41, which corresponds to the second region R2 of the second electrodes 40, is covered by an insulating film 45. Each of the first metal electrical wires 41 is conductively connected to each of the second electrodes 40 of the first region R1, and is insulated from each of the second electrode 40 of the second region R2. In other words, the first metal electrical wire 41 contributes to energization of the first region R1 of the second electrode 40, and contributes to color-producing of the pixel 60 in the first region R1.

A range of each of the second metal electrical wires 42, which corresponds to the first region R1 of the second electrodes 40, is covered by the insulating film 45. Each of the second metal electrical wires 42 is conductively connected to each of the second electrodes 40 of the second region R2, and is insulated from each of the second electrodes 40 of the first region R1. In other words, the second metal electrical wire 42 contributes to energization of the second region R2 of the second electrode 40, and contributes to color-producing of the pixel 60 in the second region R2.

A range of each of the third metal electrical wires 43, which corresponds to the fourth region R4 of the second electrodes 40, is covered by the insulating film 45. Each of the third metal electrical wires 43 is conductively connected to each of the second electrodes 40 of the third region R3, and is insulated from each of the second electrodes 40 of the fourth region R4. In other words, each of the third metal electrical wires 43 contributes to energization of the third region R3 of the second electrode 40, and contributes to color-producing of the pixel 60 in the third region R3.

A range of each of the fourth metal electrical wires 44, which corresponds to the third region R3 of the second electrodes 40, is covered by the insulating film 45. Each of the fourth metal electrical wires 44 is conductively connected to each of the second electrode 40 of the fourth region R4, and is insulated from each of the second electrodes 40 of the third region R3. In other words, each of the fourth metal electrical wires 44 contributes to energization of the fourth region R4 of the second electrodes 40, and contributes to color-producing of the pixel 60 in the fourth region R4.

Since the metal electrical wires (41 to 44) are buried in the second electrode 40, the resistance of the second electrode 40 can be reduced. This can result in prevention of a voltage depression in the longitudinal direction of the second electrode 40. As a result, color-producing is stabilized in each pixel 60 and a uniform display can be obtained.

A material for the metal electrical wires (41 to 44) is not particularly restricted, but a material constituting a metal electrode can be used. Examples of the material constituting a metal electrode may include gold, platinum, silver, chrome, aluminum, cobalt, palladium, copper, nickel, an alloy of those, and the like.

Further, the material for the insulating film 45 is not particularly restricted, and but a material having insulation properties can be used, and examples thereof may include silicon dioxide ($SiO_2$), a resist material for optical exposure, and the like.

The electrochromic composition layer 50 is configured to include, for example, a spacer 51 and an electrochromic composition 52 held in the spacer 51.

Although a thickness of the electrochromic composition layer 50 is not particularly restricted, it is preferably set to 10 μm to 500 μm, and more preferably to 30 μm to 200 μm, whereby a display function of the electrochromic composition 52 can be effectively exerted.

The spacer 51 serves to hold the electrochromic composition 52 at a fixed volume between the first substrate 10 and the second substrate 30. In other words, by containing the electrochromic composition 52, the spacer 51 serves to support the electrochromic composition 52 between the first substrate 10 and the second substrate 30, and also uniformly control an amount of the electrochromic composition 52 due to a thickness of the spacer 51.

The spacer 51 is arbitrarily formed so long as serving as described above, and examples thereof may include a porous plate-like or sheet-like body, granular materials (which may be either porous or nonporous), and the like.

When the spacer 51 is the porous plate-like body or sheet-like body, the electrochromic composition layer 50 is formed, for example, by introducing the electrochromic composition 52 into pores of the spacer 51. In this case, the electrochromic composition layer 50 may be formed by placing the spacer 51 between the first electrodes 20 . . . (first substrate 10 on which the first electrodes 20 . . . are placed) and the second electrodes 40 . . . (second substrate 30 on which the second electrodes 40 . . . are placed), and then introducing the electrochromic composition 52 into the pores of the spacer 51. It is also possible to introduce the electrochromic composition 52 into the pores of the spacer 51 to form the electrochromic composition layer 50, and then to place the electrochromic composition layer 50 between the first electrodes 20 . . . and the second electrodes 40 . . . .

Herein, as the porous plate-like or sheet-like body, it preferably has pores each penetrating the first substrate 10 and the second substrate 30 in a substantially vertical direction from the viewpoint of improvement in display performance of the electrochromic display device 100. Specific examples thereof may include anodized alumina, a mesh (net)-like sheet member, and the like, but these are not restrictive.

When the spacer 51 is the granular materials, for example, the electrochromic composition layer 50 may be formed by mixing the spacer 51 with the electrochromic composition 52 to give a paste, which is placed between the first electrodes 20 . . . and the second electrodes 40 . . . .

The electrochromic composition 52 contains a support electrolyte, a polar solvent and leuco dye.

The electrochromic composition 52 is added with: a display quality deterioration preventing agent (hydroquinone derivative and/or catechol derivative, ferrocene derivative and compound having a carbonyl group) for preventing the deterioration of display quality of the electrochromic display device 100, and an adsorbent which absorbs the leuco dye at the time of energization between the first electrodes 20 . . . and the second electrodes 40 . . . for erasing the display.

Further, examples of a component which can be added to the electrochromic composition 52 may include a polymer compound for adjusting physical properties (e.g. increased viscosity) of the electrochromic composition 52, and the like.

The electrochromic composition 52 has a function of color-producing and color-erasing for the display of the electrochromic display device 100.

Specifically, the electrochromic composition 52 produces colors by energization between the first electrodes 20 . . . and the second electrodes 40 . . . , and erases colors by energization in the reverse direction to the energization for color-producing, or by interruption of the energization for color-producing.

The electrochromic composition 52 is arbitrary so long as having fluidity, and may be a liquid with low viscosity, a paste with high viscosity, or a gel with low fluidity, for example.

The support electrolyte as a constituent component of the electrochromic composition 52 has a function for facilitating a current to flow inside the electrochromic composition 52. The support electrolyte contains a compound generally termed as molten salt. As the support electrolyte, each compound may be used singly, or plural compounds may be used in a mixed form.

The support electrolyte is preferably added in an amount of 0.01 to 20 wt % with respect to a total weight of the electrochromic composition 52, and for sufficient exertion of the function, it is more preferably added in an amount of 0.1 to 20 wt %.

Specifically, the support electrolyte is not particularly restricted so long as being a compound having the above function, and examples thereof may include a first support electrolytic compound and/or a second support electrolytic compound.

Examples of the first support electrolytic compound may include $NaClO_4$, $LiClO_4$, $KClO_4$, $RbClO_4$, $CsClO_4$, $NH_4ClO_4$, $LiBF_4$, $LiPF_6$, and the like but the compound is not restricted to these.

Examples of the second support electrolytic compound may include $(CH_3)_4NClO_4$, $(C_2H_5)_4NClO_4$, $(n-C_4H_9)_4NClO_4$, $(CH_3)_4NBF_4$, $(C_2H_5)_4NBF_4$, $(n-C_4H_9)_4NBF_4$, $(CH_3)_4NCl$, $(C_2H_5)_4NCl$, $(CH_3)_4NBr$, $(C_2H_5)_4NBr$, $(n-C_4H_9)_4NBr$, $(n-C_4H_9)_4NI$, $C_6H_5(CH_3)_3NClO_4$, $C_6H_5(C_2H_5)_3NClO_4$, $C_8H_{17}(CH_3)_3NClO_4$, $(C_2H_5)_4NPF_6$, $(n-C_4H_9)_4NPF_6$, $(CH_3)_4NCF_3SO_3$, $(C_2H_5)_4NCF_3SO_3$, and the like, but the compound is not restricted to these.

The polar solvent as the constituent component of the electrochromic composition 52 is at least one of organic solvents using the support electrolyte and showing energization properties, and has a function to promote color-erasing of the leuco dye by interruption of a voltage and/or a current. In the case of adding the polymer compound to the electrochromic composition 52, the polar solvent also serves as a solvent of the polymer compound. As the polar solvent, each kind thereof may be used singly, or appropriately used in combination of two or more of them.

Although suitable examples of the polar solvent are shown below, these are illustrative, and do not restrict the polar solvent.

Specific examples of the polar solvent may include N-methylpyrrolidone, dimethylformamide, diethylformamide, N,N-dimethyl acetamide, propylene carbonate, dimethyl sulfoxide, γ-butyrolactone, acetonitrile, propionitrile, butyronitril, and the like. Although any of the shown examples is preferred as the polar solvent to be used as the constituent component of the electrochromic composition 52, a particularly preferred example may be N,N-dimethyl acetamide.

The leuco dye as the constituent component of the electrochromic composition 52 is a colorless or light-colored electron-donating dye precursor, and is a compound which produces colors by a developer such as a phenolic compound, an acid substance or an electron-accepting subject.

Examples of the leuco dye may include a compound which has as a partial skeleton a structure of lactone, lactam, sultone, spiropyran, ester or amid, and can practically be colorless. Specific examples thereof may include a triarylmethane compound, a bisphenylmethane compound, a xanthene compound, a fluoran compound, a thiazine compound, a spiropyran compound, and the like, but these are not restrictive.

The leuco dye can perform color-producing with a variety of colors by appropriate selection out of the above compounds. Therefore, a displayed color of the electrochromic display device 100 using the leuco dye can be selected as appropriate by means of the leuco dye. Specifically, for example when a leuco dye which produces a black color is used, white, black and gray displays are possible.

Although it is difficult to summarily represent a blending amount of leuco dye since it depends on a solubility of the leuco dye, a sufficient amount of the leuco dye is required to be blended for color-producing. In a case of the leuco dye with a small solubility, for example, by increasing a volume of the electrochromic composition layer 50 (thickness of the spacer 51) which corresponds to each of the pixels 60, or by some other means, a blending amount of leuco dye may be adjusted so that a required amount thereof is contained.

The display quality deterioration preventing agent to be added to the electrochromic composition 52 is a compound having a function to prevent deterioration of the display quality of the electrochromic display device 100 associated with repeated color-producing and color-erasing operations of the leuco dye.

The display quality deterioration preventing agent is preferably added in an amount of 1 to 20 wt % with respect to a content of the leuco dye, and for sufficient exertion of the function, it is preferably added in an amount of 5 to 20 wt %.

The display quality deterioration preventing agent is a mixture of a first display quality deterioration preventing compound (a hydroquinone derivative and/or catechol derivative), a second display quality deterioration preventing compound (ferrocene derivative), and a third first display quality deterioration preventing compound (compound having a carbonyl group (acetophenone derivative and/or dibenzoyl derivative)).

An absorbent added to the electrochromic composition 52 is, for example, aluminum oxide and/or aluminum hydroxide.

Although an aspect of addition of the adsorbent (aluminum oxide and/or aluminum hydroxide) is not particularly restricted, the adsorbent is preferably added in the form of a powder into the electrochromic composition 52, and uniformly dispersed by means of an ultrasound or a homogenizer such as a ball mil or a homomixer, so as to be used as a dispersion liquid of solution of the electrochromic composition 52.

The additive amount of adsorbent varies depending on the activity, the grain size, and the like of aluminum oxide and/or aluminum hydroxide to be used.

Aluminum oxide with a small surface area, such as α alumina, aluminum oxide with a large grain size of 10 μm or more, aluminum hydroxide with a small surface area, and aluminum hydroxide with a grain size of 10 μm or more have a small adsorption effect of the leuco dye, and for sufficient exertion of the adsorption operation, the above aluminum oxide or aluminum hydroxide is added in an amount of 0.5 grams to 5 grams, preferably an amount of from 1 gram to 3 grams, with respect to 1 gram of the leuco dye.

Further, aluminum oxide with a large surface area, such as γ alumina, aluminum oxide with a small grain size of 1 μm or less, aluminum hydroxide with a large surface area, and aluminum oxide with a grain size of 1 μm or less have a large adsorption effect of the leuco dye, and hence the addition of 0.1 gram to 0.5 gram of the above aluminum oxide or aluminum hydroxide with respect to 1 gram of the leuco dye leads to exertion of sufficient adsorption operation.

Moreover, as for activated aluminas which are used for thin layer chromatography and the like, even when the activated alumina is a large grain with a grain size of several tens of μm, it exerts a sufficient adsorption operation by being added in an amount of 0.1 gram to 0.5 gram with respect to 1 gram of the leuco dye.

The adsorbent which adsorbs the leuco dye is a chemical product, and is thus readily available.

Hereinafter, suitable examples of the commercially available adsorbent will be shown, but these are illustrative, and do not restrict the adsorbent.

Specific examples of commercially available adsorbent may include: thin layer chromatography aluminum oxide 60G Neutral (grain size: 4 to 50 μm) manufactured by Merck & Co.; low soda alumina LS235 (grain size: 0.47 μm), activated alumina C200 (grain size: 4.4 μm) and aluminum hydroxide B1403 (grain size 1.5 μm), manufactured by Nippon Light Metal Co., Ltd., and γ-Alumina KC501 (grain size: 1 μm) manufactured by Sumitomo Chemical Co., Ltd.

The polymer compound which is added to the electrochromic composition 52 has a function to enhance viscosity of the electrochromic composition 52 so as to facilitate handling thereof. As the polymer compound, each kind thereof may be used singly, or appropriately used in combination of two or more of them.

Although the polymer compound is used for enhancing the viscosity of the electrochromic composition 52, properties of the electrochromic composition 52 in this case can be a liquid with low viscosity, a paste with a high viscosity or a gel with small fluidity.

A blending amount of the polymer compound is preferably from 0.1 to 80 wt % with respect to a total amount of the electrochromic composition 52.

Although suitable examples of the polymer compound are shown below, these are illustrative, and not restrictive to the polymer compound.

Specific examples of the polymer compound may include polyvinylidene fluoride, polyvinylidene chloride, polyalkylene oxide such as polyethylene oxide, a polymer with a repeating unit of polyalkylene imine or polyalkyleneimine sulfide, polymethyl methacrylate, polyacrylonitrile, polycarbonate, polyvinyl formal like polyvinyl butyral, and the like. Particularly preferred examples may include polyvinyl butyral and polyvinylidene fluoride.

The electrochromic composition 52 described above is one example, and other compositions, if being capable of electrochemical color-producing, can be held by means of the spacer 51 so as to be used as the electrochromic composition layer 50.

<Driving Method for Electrochromic Display Device>

The electrochromic display device 100 is driven in the following manner for example by a passive matrix drive.

Each of the pixels 60 of the electrochromic display device 100 is composed of the electrochromic composition layer 50 placed between the first electrodes 20 . . . and the second electrodes 40 . . . .

The electrochromic display device 100 performs a display (color-producing) in such a manner that the electrochromic composition 52 is energized by energization between the first electrodes 20 . . . and the second electrodes 40 . . . , to cause the electrochromic composition 52 of each of the pixels 60 to electrochemically change to produce colors. Further, the electrochromic display device 100 performs color-erasing by energization in the reverse direction to the energization for the display, or by interruption of the energization for the display and by leaving the device as it is. The color-erasing can be performed more rapidly by energization in the reverse direction to the energization for the display.

In particular, each of the second electrodes 40 of the electrochromic display device 100 of the present invention is divided into four regions, the first region R1 to the fourth region R4, and the respective regions (R1 to R4) of each of the second electrodes 40 are energized by the respectively corresponding metal electrical wires (41 to 44). In other words, energization to the electrochromic composition 52 is performed for each of the four regions (R1 to R4) so that a display (color-producing) of each of the regions (R1 to R4) can be independently performed.

In the conventional electrochromic display device, in the case of performing a display for one screen, a passive matrix drive for scanning 768 lines of the first electrodes 20 is required. However, in the case of the electrochromic display device 100 of the present invention, a display corresponding to one screen can be performed by a passive matrix drive for scanning 192 lines of the first electrode 20 in each region so as to simultaneously scan the four regions (R1 to R4).

In such a manner, in the electrochromic display device 100 of the present invention, it is possible to reduce the time required for scanning of all of the first electrodes 20 to a quarter of the conventionally required time, so as to reduce the time required for a display of one screen to a quarter.

A concentration of the produced colors of the electrochromic display device 100 can be arbitrarily adjusted by means of a quantity of energized electricity. Further, energization can be performed either by continuous current supply or by intermittent current supply. The intermittent current supply, for example, indicates a drive by a pulse.

The produced colors of the electrochromic display device 100 is erased by interruption of energization, but in the case of application to electronic paper or the like, produced colors need to be held. The produced colors of the electrochromic display device 100 can be held for example by supplying a smaller current than a current applied for the display. When the current is continuously supplied, the produced colors can be held with a voltage or a current being a half or less of a voltage or a current at the time of color-producing. In the case of the intermittent current supply, namely the pulse drive, the produced colors can be held for example by making the energization time shorter than at the time of color-producing, or by making an intensity, a width or an interval of the pulse smaller than at the time of color-producing.

EXAMPLES

Hereinafter, the present invention will be described in more detail by means of specific examples, but the present invention is not restricted to these.

(Production of Electrochromic Display Device)

As the first substrate 10, using an alkali-free glass substrate in a rectangular shape with a thickness of 0.7 mm, a gold (Au) thin film was formed by sputtering on one surface (top surface) of the substrate. The sputtered gold thin film had a thickness of 100 nm. The gold thin film formed by sputtering was pattern-formed using an etching method into the metal electrode section 21 in a striped shape with a stripe width of 10 μm and a pitch of 150 μm.

An ITO film was formed by sputtering on the striped pattern of the metal electrode section 21 to form a surface. The ITO film formed by sputtering had a film thickness of 200 nm and a surface resistance of 10Ω/□. The ITO film formed by sputtering was pattern-formed using the etching method into the first electrodes 20 . . . in a striped shape with a stripe width of 140 μm and a pitch of 150 μm.

As the second substrate 30, using an alkali-free glass substrate in a rectangular shape with a thickness of 0.7 mm, a gold (Au) thin film was formed by sputtering on one surface (under surface) of the substrate. The sputtered gold thin film had a thickness of 100 nm. The gold thin film formed by sputtering was pattern-formed using the etching method into metal wires in a striped shape with a stripe width of 10 μm and a pitch of 75 μm, and the central portion in the longitudinal direction of each of the metal electrical wires is cut off so as to have an interval of 10 μm and the metal electrical wires are divided to right and left, so that the metal electrical wires (41 to 44) were formed.

An insulating layer of silicon dioxide was formed by sputtering on the striped pattern of the metal electrical wires (41 to 44) to form a surface, and the insulating layer formed by sputtering was then patterned by the etching method, to form the insulating film 45 which partially covers each of the metal electrical wires (41 to 44).

An ITO film was formed by sputtering on the metal electrical wires (41 to 44) and the insulating film 45 to form a surface. The ITO film formed by sputtering had a film thickness of 200 nm and a surface resistance of 10Ω/□. The ITO film formed by sputtering was pattern-formed using the etching method into a striped shape with a stripe width of 140 μm and a pitch of 150 μm, and the ITO film was divided equally into four in a direction of the stripe (longitudinal direction), to form the second electrodes 40 . . . such that an interval theramong was 10 μm (see FIG. 4).

Next, the spacer 51 (granular materials (micropearl GS-260 (grain size of 60 μm), manufactured by SEKISUI CHEMICAL CO., LTD.) was placed between the first electrodes 20 . . . and the second electrodes 40 . . . , and the first substrate 10 on which the first electrodes 20 . . . were formed and the second substrate 30 on which the second electrodes 40 . . . were formed were superimposed on each other such that the first electrodes 20 . . . are orthogonal to the second electrodes 40 . . . , and the orthogonal sections are the pixels 60 . . . . Then, three out of four side surfaces (surfaces in parallel with the thickness direction) were bonded and sealed using an adhesive (e.g. thermosetting epoxy).

Subsequently, from an adhesive non-bonded portion, the electrochromic composition 52 (hereinafter referred to as "electrochromic composition A") added with a predetermined additive (display quality deterioration preventing agent, polymer compound, and the like) was poured using a pipet. The adhesive non-bonded portion out of the four side surface (surfaces in parallel with the thickness direction) was bonded and sealed using the adhesive, to produce the electrochromic display device 100.

A composition of the electrochromic composition A is as follows:
support electrolyte (tetra-n-butylammonium tetrafluoroborate (n-$C_4H_9$)$_4$$NBF_4$)—100 mg;
polar solvent (mixture of Dimethyl sulfoxide, DMSO and propylene carbonate, PC at 1:1)—1.0 g
leuco dye (Formula (1) below)—300 mg
hydroquinone derivative (Formula (2) below)—56 mg;
ferrocene derivative (Formula (3) below)—15 mg;
compound having carbonyl group (dibenzoyl derivative) (Formula (4) below)—106 mg;
adsorbent (aluminum oxide, activated alumina C200, manufactured by Nippon Light Metal Co., Ltd.)—75 mg; and
polymer compound (polyvinyl butyral, S-LEC BH3, manufactured by SEKISUI CHEMICAL CO., LTD.)—25 mg.

[Chemical Formula 1]

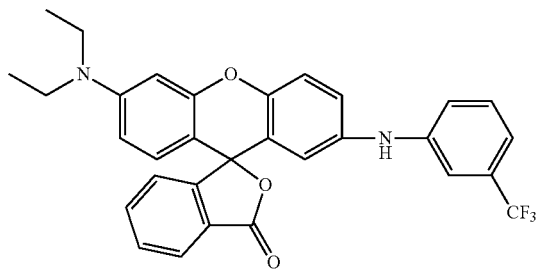

(1)

[Chemical Formula 2]

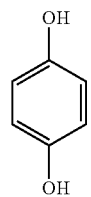

(2)

[Chemical Formula 3]

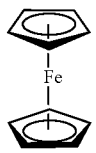

(3)

[Chemical Formula 4]

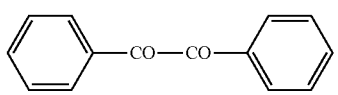

(4)

(Display Operation)

A pattern creating circuit was connected to portions of 768 lines of line electrodes (first electrodes 20) (768 metal electrode sections 21) and 1024 lines of data electrodes (second electrode 40) (1024 each of metal electrical wires (41 to 44)) in the electrochromic display device 100.

Next, energization for a display was performed using the passive-matrix drive method. Specifically, a negative voltage (−3 V) was applied to the first electrode 20 forming the selected pixel 60 (selected pixel), and a positive voltage (+3 V) was applied to the second electrode 40 forming the selected pixel, to apply a 6 V voltage between the electrodes at the rate of 1 millisecond per line so as to form a display pattern.

Especially for simultaneous scanning of the four regions (R1 to R4) corresponding to the data electrodes (second electrodes 40), the passive matrix drive was performed to scan 192 lines of the line electrodes (first electrodes 20) in each of the regions (R1 to R4) at the rate of 1 millisecond per line, to form the display pattern in 0.192 second.

(Holding Operation)

Subsequently, a negative voltage (−1.5 V) was applied to the first electrode 20 forming the selected pixel, and a positive voltage (+1.5 V) was applied to the second electrode 40 forming the selected pixel, to apply a 3 V voltage between the electrodes at the rate of 1 millisecond per line so as to hold the display pattern for 10 seconds.

(Erasing Operation)

Next, energization (energization for erasing) was performed in the reverse direction to that for the display. Specifically, a positive voltage (+1.5 V) was applied to the first electrode 20 forming the selected pixel, and a negative voltage (−1.5 V) was applied to the second electrode 40 forming the selected pixel, to apply a 3 V voltage between the electrodes at the rate of 1 millisecond per line for energization for 0.5 second, so as to erase the display pattern.

(Visual Evaluation)

In the present Example, it was possible to display a pattern of English letters with high resolution by the above display operation.

Further, it was possible to hold the displayed pattern of English letters with high resolution by the above holding operation.

Moreover, it was possible to reliably erase the displayed pattern of English letters by the above erasing operation.

As thus described, the electrochromic display device 100 of the present invention can perform a display for one screen by the passive matrix drive to scan 192 lines of the first electrodes 20 in each region in such a manner as to simultaneously scan the four regions (R1 to R4) regarding the second electrode 40. Accordingly, the time, having been required for the passive matrix drive to scan 768 lines of the first electrodes 20 in a display for one screen in the conventional electrochromic display device, can be reduced to a quarter.

Specifically, in the case of scanning 768 lines of the first electrodes 20 at the rate of 1 millisecond per line, a display pattern for one screen is formed in 0.768 second, whereas as in the present invention, 192 lines of the first electrodes 20 in each of the regions (R1 to R4) are scanned so that a display pattern for one screen can be formed in 0.192 second.

In such a manner, in the electrochromic display device 100 of the present invention, it is possible to reduce the time required for scanning of all of the first electrodes 20 to a quarter of the conventionally required time, so as to reduce the time required for a display for one screen to a quarter. It is then possible for the electrochromic display device 100 to more rapidly switch a display of a screen by reduction in time required for a display per one screen.

Thus, the electrochromic display device 100 can function as a display device capable of more rapidly switching a screen.

(Embodiment 2)

Next, Embodiment 2 of the electrochromic display device according to the present invention will be described. It is to be noted that a similar configuration to that of Embodiment 1 is provided with the same numeral and its description is omitted.

Figure 5:
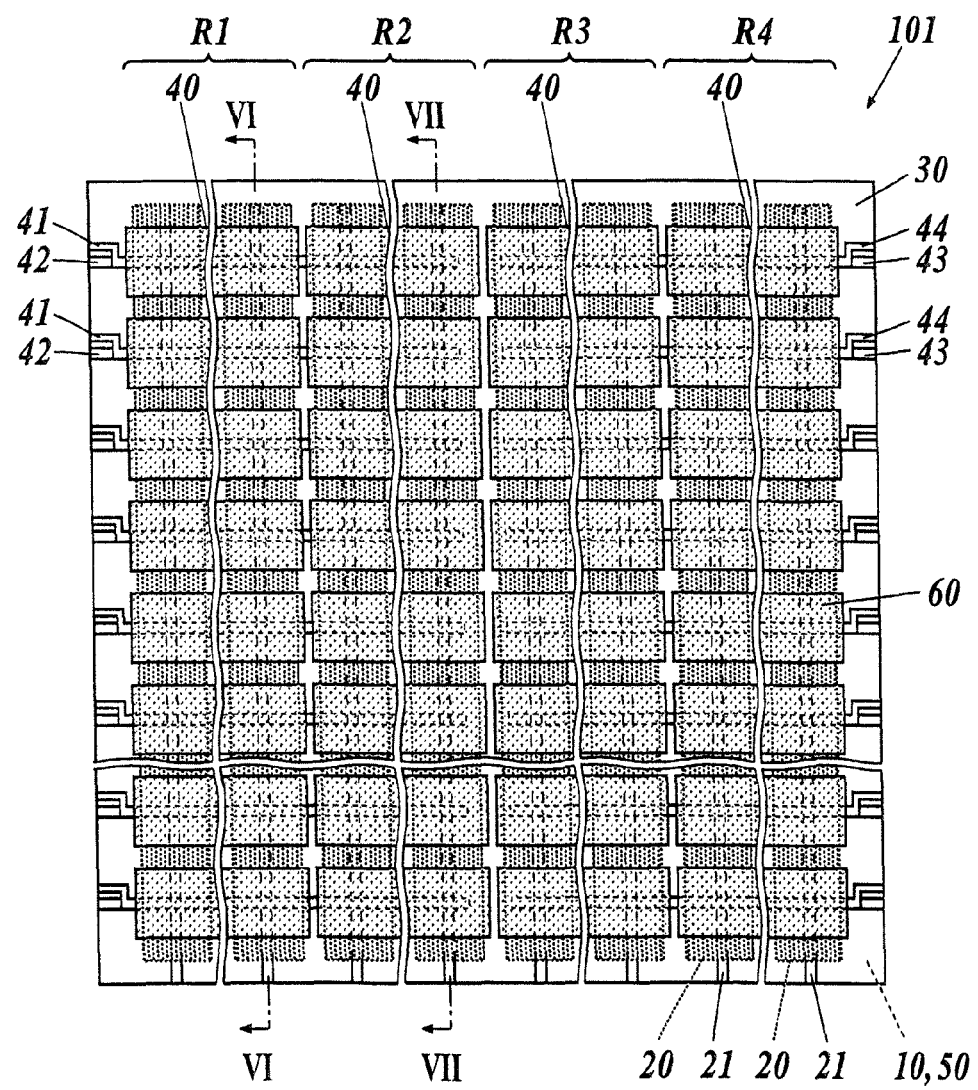
FIG. 5 is a plan view schematically showing an electrochromic display device according to Embodiment 2.
Figure 6:
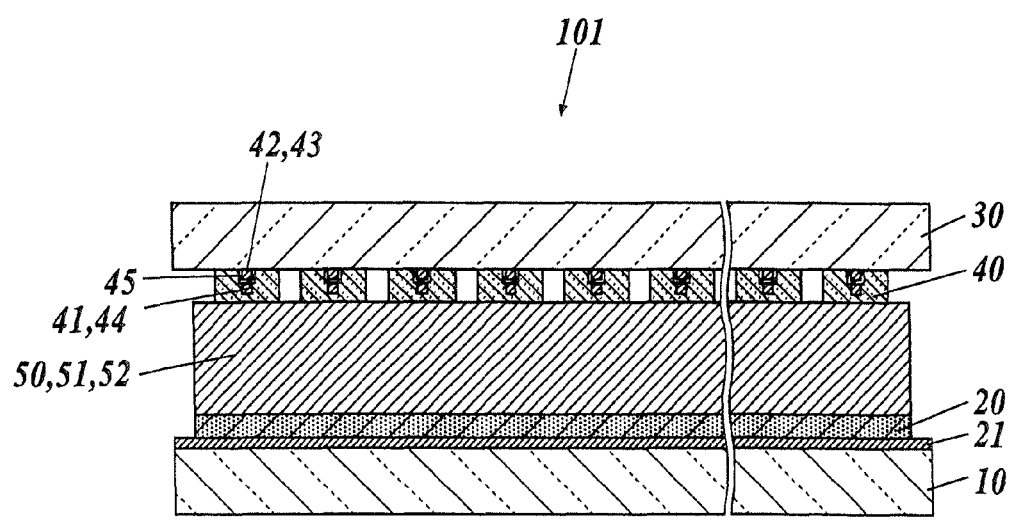
FIG. 6 is a sectional view on a line VI-VI of FIG. 5.
Figure 7:
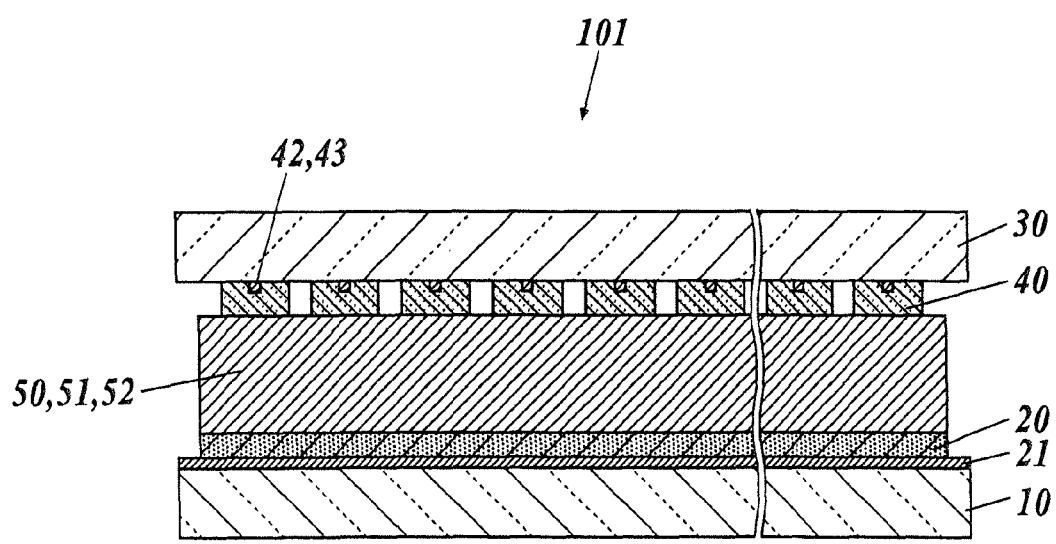
FIG. 7 is a sectional view on a line VII-VII of FIG. 5.

An electrochromic display device 101 is, for example as shown in FIGS. 5 to 7, configured to include: the first substrate 10; the first electrodes 20 . . . which are provided on the top surface of the first substrate 10; the second substrate 30 which is provided above the first substrate 10 to opposite to the first substrate 10; the second electrodes 40 . . . which are provided on the under surface of the second substrate; and an electrochromic composition layer, provided between the first substrate 10 and the second substrate 30.

As shown in FIGS. 5 to 8, metal electrical wires (41 to 44) as metal electrode sections which extend along the second electrodes 40, are provided between the second electrodes 40 and the second substrate 30, correspondingly to the respective second electrodes 40.

The second metal electrical wires 42 are provided on the under surface of the second substrate 30, and each of the first metal electrical wires 41 is superimposed on each of the second metal electrical wires 42.

The third metal electrical wires 43 are provided on the under surface of the second substrate 30, and each of the fourth metal electrical wires 44 is superimposed on each of the third metal electrical wires 43.

The metal electrical wires (41 to 44) are covered by the respective second electrodes 40.

Figure 8:
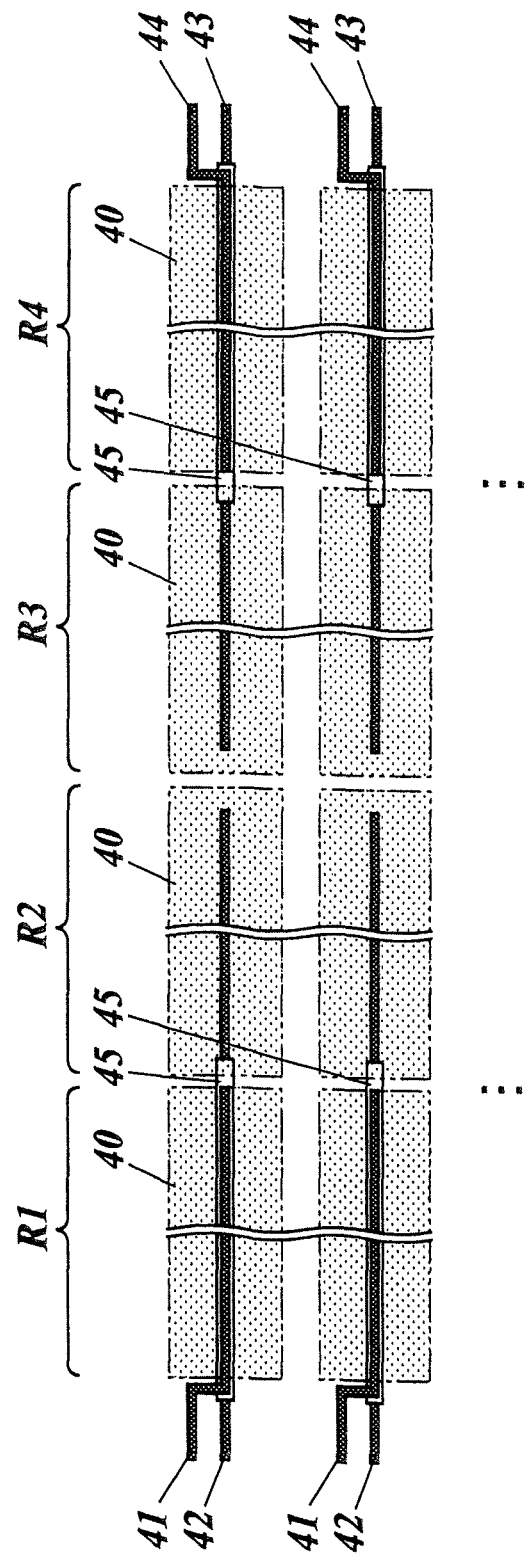
FIG. 8 is an illustrative view showing four regions of the second electrode and an arrangement of metal electrical wires according to Embodiment 2.

Specifically, as shown in FIG. 8, each of the second metal electrical wires 42 extends from one end of each of the second electrodes 40 to the center side of the substrate, and is arranged over a place from the first region R1 to the second region R2 of each of the second electrodes 40. Further, each of the first metal electrical wires 41 is arranged over a range from one end of each of the second electrodes 40 to the first region R1 of each of the second electrodes 40 so as to be superimposed on each of the second metal electrical wires 42. In other words, each of the first metal electrical wires 41 is superimposed on each of the second metal electrical wires 42 on the under surface of the second substrate 30.

Further, as shown in FIG. 8, each of the third metal electrical wires 43 extends from the other end of the second electrode 40 to the center side of the substrate, and is arranged over a place from the fourth region R4 to the third region R3 of each of the second electrodes 40. Further, the fourth metal electrical wire 44 is provided over a range from the other end of each of the second electrodes 40 to the fourth region R4 of each of the second electrodes 40 so as to be superimposed on each of the third metal electrical wire 43. In other words, each of the fourth metal electrical wires 44 is superimposed on each of the third metal electrical wires 43 on the under surface of the second substrate 30.

In addition, it is preferable that metal electrical wires (41 to 44) be provided on the edge sides of the second electrode 40. Since the metal electrical wires (41 to 44) have no optical transparency, providing the metal electrical wires on the edge sides of the second electrode 40 prevents the wires from interfering with a display by color-producing of the pixel 60 (electrochromic composition layer 50).

More specifically, as shown in FIG. 8, a range of each of the second metal electrical wires 42, which corresponds to the first region R1 of each of the second electrode 40, is covered by an insulating film 45. Each of the second metal electrical wires 42 is conductively connected to each of the second electrodes 40 in the second region R2, and is insulated from each of the second electrode 40 in the first region R1. In other words, the second metal electrical wires 42 contribute to energization of the second region R2 of the second electrodes 40, and contribute to color-producing of the pixels 60 in the second region R2.

Each of the first metal electrical wires 41 is provided on the insulating film 45 covering each of the second metal electrical wires 42 in the first region R1 of each of the second electrodes 40. Each of the first metal electrical wires 41 is conductively connected to each of the second electrodes 40 in the first region R1. In other words, the first metal electrical wires 41 contribute to energization of the first region R1 of the second electrodes 40, and contribute to color-producing of the pixels 60 in the first region R1.

Further, as shown in FIG. 8, a range of each of the third metal electrical wires 43, which corresponds to the fourth region R4 of each of the second electrode 40, is covered by the insulating film 45. Each of the third metal electrical wire 43 is conductively connected to each of the second electrode 40 in the third region R3, and is insulated from each of the second electrodes 40 in the fourth region R4. In other words, the third metal electrical wires 43 contribute to energization of the third region R3 of the second electrodes 40, and contribute to color-producing of the pixels 60 in the third region R3.

Each of the fourth metal electrical wires 44 is provided on the insulating film 45 covering each of the third metal electrical wires 43 in the fourth region R4 of each of the second electrodes 40. Each of the fourth metal electrical wires 44 is conductively connected to each of the second electrode 40 in the fourth region R4. In other words, the fourth metal electrical wires 44 contribute to energization of the fourth region R4 of the second electrodes 40, and contribute to color-producing of the pixels 60 in the fourth region R4.

Also in the electrochromic display device 101, each of the second electrodes 40 is divided into four regions, the first region R1 to the fourth region R4, and the respective regions (R1 to R4) of each of the second electrodes 40 are energized by the respectively corresponding metal electrical wires (41 to 44). In other words, energization to the electrochromic composition 52 is performed for each of the four regions (R1 to R4) so that a display (color-producing) of each of the regions (R1 to R4) can be independently performed.

Also in the electrochromic display device 101 as thus described, 192 lines of the first electrodes 20 corresponding to each of the regions (R1 to R4) of each of the second electrodes 40 can be scanned at the rate of 1 millisecond per line, to form a display pattern for one screen in 0.192 second so that the display for one screen can be performed in a quarter of the conventionally required time.

Since the electrochromic display device 101 can reduce the time required for a display per one screen from the time required in the conventional display device, it functions as a display device capable of more rapidly switching a display of a screen.

It should be noted that, although each of the second electrodes 40 is divided into the four regions (R1 to R4) in the above embodiment, the present invention is not restricted to this, and it may also be divided into an arbitrary number and the metal electrical wires may be formed according to that number.

Further, it is natural that a specific detailed structure and the like can be modified as appropriate.

According to the embodiments, there is provided an electrochromic display device, including: a first substrate; at least one first electrode which is provided on a top surface of the first substrate; a second substrate which is provided above the first substrate so as to be opposite to the first substrate, and which second substrate is formed of a transparent material; at least one second electrode which is provided on an under surface of the second substrate, and at least part of which second electrode is formed of a transparent material; and an electrochromic composition layer which is provided between the first substrate and the second substrate, wherein the electrochromic display device is a passive-matrix driven electrochromic display device which performs a display by energization between the first electrode and the second electrode, and performs erasing of the display by energization between the first electrode and the second electrode in a reverse direction to the energization for the display, the at least one first electrode is a plurality of electrodes which extend in parallel with one another, the at least one second electrode is a plurality of transparent display electrodes which extend in parallel with one another in a direction orthogonal to the first electrodes, and each of the second electrode is divided into a plurality of regions each of which intersects with the first electrodes, a pixel is formed in a portion where the first electrodes sterically intersect with the second electrodes, and a plurality of metal electrical wires which extend over the regions are provided between the second electrodes and the second substrate in a direction along the second electrodes, each of which metal electrical wires is conductively connected to each of the second electrodes corresponding to any one of the regions, and insulated from each of the second electrodes corresponding to the other regions.

Preferably, each of the second electrodes is divided into the regions each of which intersects with the same number of first electrodes.

Preferably, a) some of the metal electrical wires extend from one end to a central side of the second electrodes and are provided over a region on one half-surface side of the electrochromic display device, and b) the others of the metal electrical wires extend from the other end to the central side of the second electrodes and are provided over a region on the other half-surface side in the electrochromic display device.

Preferably, the metal electrical wires are provided in parallel with one another so as to be spaced from one another on the under surface of the second substrate, and covered by the respective second electrodes.

Preferably, the metal electrical wires are provided so as to be superimposed on one another on the under surface of the second substrate, and covered by the respective second electrodes.

According to the present invention, each of the second electrodes of the electrochromic display device is divided into a plurality of regions which intersect with the first electrodes, and the respective regions of the each of the second electrodes are energized by the corresponding metal electrical wires. Thus, energization to the electrochromic composition layer is performed for each of the regions of the each of the second electrodes so that a display of each of the regions can be independently performed.

By performing the display of one screen by the passive-matrix drive to scan each of the first electrodes corresponding to each of the regions, time required for displaying one screen can be reduced.

Specifically, for example, in the conventional electrochromic display device, when the passive-matrix drive to scan 768 lines of the first electrodes is required for performing the display of one screen, each of the second electrodes is divided into four regions which intersect 192 lines of the first electrodes, and the metal electric wires respectively correspond to the regions are provided. By the passive-matrix drive to scan 192 lines of the first electrodes of each of the regions so that the four regions are simultaneously scanned, the display of one screen can be performed. By this, time required for scanning all the first electrodes can be reduced to quarter of the conventional time, and time required for displaying one screen can be reduced to quarter of the conventional time.

Thus, according to the electrochromic display device of the present invention, by scanning the first electrodes of the respective regions, the time required for scanning all the first electrodes can be reduced, and the time required for displaying one screen can be reduced.

Since the time required for displaying one screen can be reduced, the screens of the electrochromic display device can be more swiftly switched.

The entire disclosure of Japanese Patent Application No. 2010-167833 filed on Jul. 27, 2010 including description, claims, drawings, and abstract are incorporated herein by reference in its entirety.

What is claimed is:

1. An electrochromic display device, comprising:
a first substrate;
at least one first electrode which is provided on a top surface of the first substrate;
a second substrate which is provided above the first substrate so as to be opposite to the first substrate, and which second substrate is formed of a transparent material;

at least one second electrode which is provided on an under surface of the second substrate, and at least part of which second electrode is formed of a transparent material; and an electrochromic composition layer which is provided between the first substrate and the second substrate, wherein the electrochromic display device is a passive-matrix driven electrochromic display device which performs a display by energization between the first electrode and the second electrode, and performs erasing of the display by energization between the first electrode and the second electrode in a reverse direction to the energization for the display, the at least one first electrode is a plurality of electrodes which extend in parallel with one another, the at least one second electrode is a plurality of transparent display electrodes which extend in parallel with one another in a direction orthogonal to the first electrodes, and each of the second electrodes is divided into a plurality of regions each of which intersects with the first electrodes, a pixel is formed in a portion where the first electrodes sterically intersect with the second electrodes, and a plurality of metal electrical wires which extend over the regions are provided between the second electrodes and the second substrate in a direction along the second electrodes, each of which metal electrical wires is conductively connected to each of the second electrodes corresponding to any one of the regions, and insulated from each of the second electrodes corresponding to the other regions.

2. The electrochromic display device according to claim 1, wherein each of the second electrodes is divided into the regions each of which intersects with the same number of first electrodes.

3. The electrochromic display device according to claim 1, wherein a) some of the metal electrical wires extend from one end to a central side of the second electrodes and are provided over a region on one half-surface side of the electrochromic display device, and b) the others of the metal electrical wires extend from the other end to the central side of the second electrodes and are provided over a region on the other half-surface side in the electrochromic display device.

4. The electrochromic display device according to claim 1, wherein the metal electrical wires are provided in parallel with one another so as to be spaced from one another on the under surface of the second substrate, and covered by the respective second electrodes.

5. The electrochromic display device according to claim 1, wherein the metal electrical wires are provided so as to be superimposed on one another on the under surface of the second substrate, and covered by the respective second electrodes.

* * * * *